Dec. 9, 1958 L. V. HEBENSTREIT 2,863,975
HEAT DETECTING CABLE
Filed March 15, 1955

INVENTOR
Lester V. Hebenstreit
BY
Ernest A. Joerren
ATTORNEY

United States Patent Office 2,863,975
Patented Dec. 9, 1958

2,863,975

HEAT DETECTING CABLE

Lester V. Hebenstreit, Bloomfield, N. J., assignor to Specialties Development Corporation, Belleville, N. J., a corporation of New Jersey Application March 15, 1955, Serial No. 494,517

1 Claim. (Cl. 201—63)

The present invention relates to heat and flame detecting devices; and, more particularly, is concerned with an improved heat and flame detecting cable, wherein electrically conductive elements are separated by a mass of material which acts as an insulator at a given temperature and is adapted to be rendered electrically conductive at another temperature.

Heretofore, such cables have been constructed by having the mass of material surround two electrically conductive uninsulated wires and maintain them spaced apart, and inserting this assembly in a bendable tube adapted to enclose the same. Since the portion of the mass between the wires which was required to be rendered conductive to establish an electrical connection between the wires is at the center of the assembly, it was necessary to transmit the ambient change in temperature inwardly through the entire mass in order to produce a response, whereby a greater than desired period of time elapsed before such response could be produced. For example, difficulty has been encountered in causing a flame to produce such a response within five seconds.

It also has been proposed to avoid such complications by utilizing a cable comprising a single wire embedded in the mass of material and having a conductive tube surrounding the mass. However, the difficulty with such cables is that the mass is not in good electrical contact with the inner wall of the tube throughout the length thereof, whereby, when heat or flame is concentrated on a portion of the cable where the contact between the mass and the tube is imperfect, such heat or flame condition will not be detected quickly, accurately and uniformly.

The present invention aims to overcome these difficulties by providing a heat or flame detecting cable comprising inner and outer electrically conductive tubular elements and a mass of material between the elements in close engagement therewith, which mass acts as an insulator at normal temperatures and as a conductor at abnormal temperature.

Accordingly, an object of the present invention is to provide such cables which are accurate and reliable and yet are simple and economical in construction.

Another object is to provide such cables having a greater resistance to vibration for a given mass per unit length than the cables heretofore proposed.

A further object is to provide such cables having a high heat absorption area to mass ratio.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein.

Figure 1:
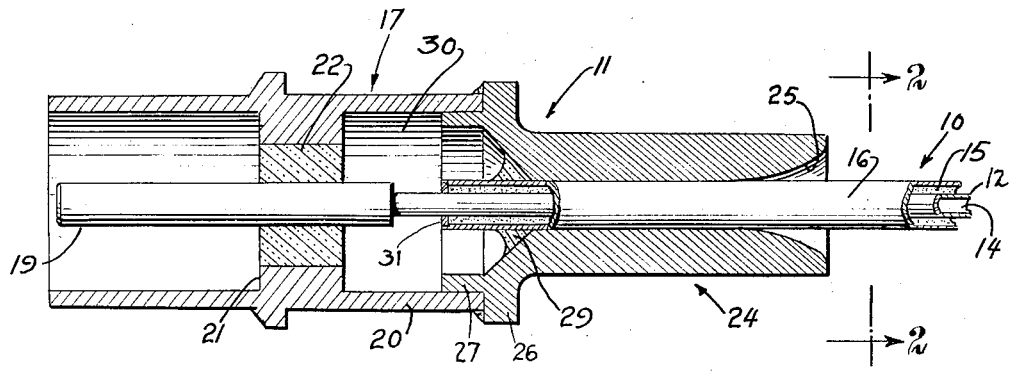
Fig. 1 is an enlarged fragmentary longitudinal sectional view of a cable, in accordance with the present invention, having a connector at one end thereof.
Figure 2:
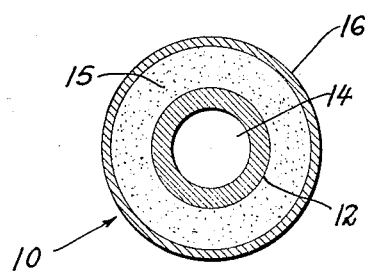
Fig. 2 is a further enlarged sectional view taken along the lines 2—2 on Fig. 1.

Referring to the drawing in detail, there is shown a heat or flame detecting cable 10 and an end connector 11 for the cable.

The cable 10 comprises an electrically conductive uninsulated bendable tube 12 having a bore 14 an annular mass of ceramic-like, thermistor material 15 surrounding the tube 12 and an electrically conductive bendable tube or sheath 16 surrounding the mass 15. The tubes 12 and 16 are co-axial and substantially coextensive in length and the mass closely engages the same.

The mass of material 15 acts as an insulator at a given temperature and is adapted to be rendered electrically conductive at another temperature. This material may be of the type disclosed in United States Patent No. 2,495,867, dated January 31, 1950.

The connector 11 generally comprises an electrically conductive tubular body 17 in connection with the tube 16, and an electrically conductive pin or rod 19 extending axially within the body and centrally located therein but insulated therefrom and in electrical connection with the tube 12. The cable and connector assembly in this manner provide two conductors across which an electrical connection can be made when the material 15 becomes conductive to establish a circuit.

The tubular body 17 comprises a metallic sleeve 20 formed with an apertured wall 21 at about the middle thereof wherein a mass of material 22 is positioned, such as electrical glass, which supports the pin 19 and, if desired, forms a hermetic seal between the pin and the wall while insulating the pin therefrom; and a metallic closure 24 having a tubular section 25 through which the cable 10 extends and having a flange 26 and a collar 27 fitting into the sleeve 20 and hermetically sealed thereto by soldering, welding or brazing the flange to the external end of the sleeve.

Solder or brazing material 29 electrically and structurally connects the tube 16 and the closure 24 and, if desired, forms a hermetic seal between these elements. The tube 12 is electrically connected to the pin 19.

In this manner, an airtight chamber 30 may be provided wherein the end of the cable 10 is located and is sealed against moisture getting into the material 15 within the tube 16. If desired, this end of the cable tube may be further sealed by a glass bead 31 through which the tube 12 extends.

Only one end of the cable and connector assembly is shown herein for purpose of illustration, but it will be understood that the end not shown may be identical therewith.

In accordance with the invention, the zone of the mass affected by changes in temperature to render the same conductive is a relatively thin annular cross-sectional area close to the outer periphery of the sheath tube 16, whereby heat flow is rapidly effected through the zone to be rendered conductive and produce a more rapid response than heretofore where penetration to the center of the mass was required. Also, the zone to be rendered conductive is uniform circumferentially, whereby a response in about the same time can be produced regardless of the angular application of the temperature changing source.

By utilizing a tubular central conductor 12 instead of a wire, the cable is more resistive to vibrations and thus tends to reduce the amplitude of such vibrations, whereby breakage of the tube 16 at the zone where it enters and engages the tubular closure section 25 is eliminated or greatly minimized to prolong the useful life of the cable and connector assembly. This can be accomplished without material increase in weight for a given length of cable. The cable so formed is sufficiently bendable to arrange the same in any desired lineal contour.

Also, by utilizing a tubular central conductor 12 adapted to be uniformly compressed or reduced slightly in circumference, instead of a solid wire, the outer tube 16, is adapted to be drawn down over the mass 15 sufficiently to cause close engagement thereof against the tubes 12 and 16, whereby contact between the mass and the tubes is perfected lengthwise and circumferentially so that current can flow between the conductors through a minimum path of mass at any point thereof. The cable so constructed has a high heat absorption area to weight ratio, and the mass 15 responds more rapidly and uniformly to produce conduction of electricity between the tubes 12 and 16.

The elements of the cables, in order to accomplish the advantages set forth herein, may have the following final dimensions:

|  | Inch |
|---|---|
| Tube 16: Outer diameter | .188 |
| Inner diameter | .158 |
| Tube 12: Outer diameter | .128 |
| Inner diameter | .112 |
| Mass 15, wall thickness | .015 |

In such a cable, heat flow must penetrate radially only .030 inch to produce conduction between the tubes 12 and 16.

Initially the tubes may have the following dimensions:

|  | Inch |
|---|---|
| Tube 16: Outer diameter | .208 |
| Inner diameter | .178 |
| Tube 12: Outer diameter | .133 |
| Inner diameter | .117 |

The drawing down of the tube 16 to the extent that the tube 12 is slightly reduced in diameter assures close engagement between the tubes and the mass entirely throughout the contacting surfaces thereof.

Alternatively, such close engagement by the tubes on the mass could be effected by slightly expanding the inner tube 12.

From the foregoing description, it will be seen that the present invention provides a novel and useful cable of the heat or flame detecting type without appreciable increase in cost or weight thereof.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

A bendable cable-like structure of indefinite continuous length for use in the detection of abnormal temperature conditions at any location along its length, comprising an inner electrically conductive uninsulated bendable tubular wire-like element, an outer electrically conductive bendable tubular element formed of material having relatively high heat conductivity and surrounding said inner element in spaced relation therewith, said inner and outer elements being co-extensive with each other and said inner element extending outwardly beyond said outer element at the ends thereof to adapt the same for electrical connection exteriorly of said outer element and a mass of thermistor material acting as an insulator at normal temperatures and being adapted to be rendered electrically conductive at abnormal temperatures disposed between said inner and outer elements to co-axially position said inner element within said outer element, the diameter of said outer element being reduced along its entire length after assembly thereof in the foregoing manner to exert pressure on said mass and thereby position and maintain said mass in close fitting engagement and in electrically conductive contact with said inner and outer elements so that electrical current can flow between said elements through a path of minimum radial dimension at any point along the length of said elements, said inner element being under compression to further establish and maintain electrically conductive contact between said mass and said elements.

References Cited in the file of this patent

UNITED STATES PATENTS

| 1,263,351 | Schneider | Apr. 16, 1918 |
| 2,258,737 | Browne | Oct. 14, 1941 |
| 2,375,058 | Weigand | May 1, 1945 |
| 2,487,526 | Dahm et al. | Nov. 8, 1949 |
| 2,490,934 | Vogel | Dec. 13, 1949 |
| 2,566,335 | Joerren | Sept. 4, 1951 |